US008446703B2

(12) United States Patent
Klaube et al.

(10) Patent No.: US 8,446,703 B2
(45) Date of Patent: May 21, 2013

(54) SURGE ARRESTER WITH A CAGE DESIGN

(75) Inventors: Hartmut Klaube, Hermsdorf (DE); Hubert Lauritsch, Hermsdorf (DE)

(73) Assignee: Tridelta Uberspannungsableiter GmbH, Hermsdorf (DE)

( * ) Notice: Subject to any disclaimer, the term of this patent is extended or adjusted under 35 U.S.C. 154(b) by 373 days.

(21) Appl. No.: 11/944,959

(22) Filed: Nov. 26, 2007

(65) Prior Publication Data

US 2008/0088406 A1 Apr. 17, 2008

Related U.S. Application Data

(63) Continuation of application No. PCT/EP2006/062433, filed on May 18, 2006.

(30) Foreign Application Priority Data

May 25, 2005 (DE) ......................... 10 2005 024 206

(51) Int. Cl.
*H02H 3/22* (2006.01)
*H02H 9/06* (2006.01)

(52) U.S. Cl.
USPC .............. 361/117; 361/126; 361/127; 411/54

(58) Field of Classification Search
USPC ..................... 361/118, 117, 126, 127; 411/54
See application file for complete search history.

(56) References Cited

U.S. PATENT DOCUMENTS

| | | | | | |
|---|---|---|---|---|---|
| 3,534,989 | A | * | 10/1970 | Yonkers | 403/369 |
| 3,554,217 | A | * | 1/1971 | Ehrens et al. | 137/318 |
| 3,698,749 | A | * | 10/1972 | Yonkers | 403/197 |
| 4,825,188 | A | * | 4/1989 | Parraud et al. | 338/21 |
| 4,851,955 | A | * | 7/1989 | Doone et al. | 361/117 |
| 4,921,004 | A | * | 5/1990 | Lane et al. | 137/318 |
| 4,930,039 | A | * | 5/1990 | Woodworth et al. | 361/127 |
| 5,161,916 | A | * | 11/1992 | White et al. | 405/259.6 |
| 5,363,266 | A | * | 11/1994 | Wiseman et al. | 361/127 |
| 5,444,429 | A | * | 8/1995 | Sakich et al. | 338/21 |
| 5,936,826 | A | * | 8/1999 | Schmidt | 361/127 |
| 6,777,614 | B1 | * | 8/2004 | Suenwoldt | 174/53 |
| 6,829,871 | B1 | * | 12/2004 | McSherry et al. | 52/705 |

FOREIGN PATENT DOCUMENTS

| | | |
|---|---|---|
| DE | 2054914 | 7/1971 |
| JP | 08115626 | 5/1996 |
| JP | 2002175905 | 6/2002 |
| JP | 2002260905 | 9/2002 |
| JP | 2003332108 | 11/2003 |
| JP | 2005019807 | 1/2005 |

OTHER PUBLICATIONS

European Opposition EP 1 883934 B1, 8 pgs., dated Jan. 5, 2010.

(Continued)

*Primary Examiner* — Rexford Barnie
*Assistant Examiner* — Zeev V Kitov
(74) *Attorney, Agent, or Firm* — McCracken & Frank LLC

(57) ABSTRACT

The invention relates to a surge arrester having at least one varistor block 1, one end fitting 3, one reinforcing element 9 which holds the varistor block 1 firmly on the end fitting 3 with a tensile load, and at least one anchoring element 27 which holds the reinforcing element 9 firmly on the end fitting 3 with a tensile load wherein the anchoring element 27 has at least one edge 29 which cuts into the reinforcing element 9. The anchoring element 27 is preferably a cutting-ring screw union.

20 Claims, 6 Drawing Sheets

OTHER PUBLICATIONS

Reply to the European Opposition No. EP1883934 B1, (4 pages) dated Sep. 6, 2010.

Preliminary Opinion of the Opposition Division of the EPO (11 pages) dated Oct. 31, 2011, regarding Opposition No. EP1883934 B1.

Translation of Opposition dated Jan. 5, 2010 for European Patent No. EP1 883 934 B1, application No. 06755259.6, Title: "Cage-type Surge Protector" for patentee Tridelta Uberspannungsableiter GmbH, 8 pages.

Translation of Preliminary Opinion of the Opposition Division dated Oct. 31, 2011 for European Patent Application No. 06755259.6, 10 pages.

Letter to EPO including Main Request (annotated) and First Auxiliary Request (annotated), attachments, dated Feb. 29, 2012 (8 pages) regarding Opposition No. EP1883934 B1.

Second Auxiliary Request (annotated) of Mar. 28, 2012 (3 pages) regarding Opposition No. EP1883934 B1.

Final Opinion of the Opposition Division of the EPO dated Apr. 11, 2012 (13 pages), regarding Opposition No. EP1883934 B1.

Annex 1 (Main Request) of the Final Opinion of the Opposition Division of the EPO (3 pages), regarding Opposition No. EP1883934 B1.

Annex 2 (Third Auxiliary Request) of the Final Opinion of the Opposition Division of the EPO (3 pages), regarding Opposition No. EP1883934 B1.

Annex 3 of the Final Opinion of the Opposition Division of the EPO (2 pages), regarding Opposition No. EP1883934 B1.

English Translation of Letter to EPO including Main Request and First Auxiliary Request, attachments, dated Feb. 29, 2012 (6 pages) regarding Opposition No. EP1883934 B1.

English Translation of Second Auxiliary Request of Mar. 28, 2012 (2 pages) regarding Opposition No. EP1883934 B1.

English Translation of Final Opinion of the Opposition Division of the EPO dated Apr. 11, 2012 (14 pages), regarding Opposition No. EP1883934 B1.

English Translation of Annex 2 (Third Auxiliary Request) of the Final Opinion of the Opposition of the EPO (3 pages), regarding Opposition No. EP1883934 B1.

* cited by examiner

SURGE ARRESTER WITH A CAGE DESIGN

CROSS-REFERENCE TO RELATED APPLICATIONS

The present application is a Continuation of International Application No. PCT/EP2006/062433, filed May 18, 2006, which claims the benefit of German Application No. DE 102005024206.5, filed May 25, 2006. All of the above listed applications are hereby incorporated by reference herein in their entireties.

BACKGROUND OF THE INVENTION

The invention relates to a surge arrester having a cage design, as is known by way of example from JP 62-149511 (application number). Surge arresters are connected between live cables and earth in electrical power supply systems in order, when an overvoltage occurs on the line, to dissipate this overvoltage to earth and thus to protect other components in the power supply network. A surge arrester such as this contains a stack of varistor blocks, which is held between two connecting elements. This arrangement is accommodated in a housing.

In order to ensure that the varistor blocks make good contact with one another even when mechanical loads are applied, the stack must be held together under pressure. In the case of surge arresters such as these with a cage design, this is achieved by means of reinforcing elements, generally rods or cables, preferably glass-fibre-reinforced plastic rods (GFC rods) which are held in tension at the two end fittings.

One problem with surge arresters such as these is to attach the reinforcing elements securely to the end fittings such that the necessary strength is maintained even in the event of mechanical loads such as those, which occur in the case of surge arresters installed in the open air.

In the cited Japanese patent application, this problem is solved by providing grooves in the stacking direction of the varistor blocks in the end fittings, into which grooves the reinforcing elements are inserted, and in which the end of the reinforcing elements is equipped with a thread onto which a nut is screwed whose diameter is larger than the groove in the end fitting, thus holding the reinforcing element—essentially by means of an interlocking connection.

Although this allows a surge arrester to be designed in an effective manner, this results in the problem of the thread cutting into the GFC rods that are used as reinforcing elements, without damaging them. This is complex and expensive.

Further options are known from European Patent Application EP 93 915 343.3, as to how reinforcing elements can be anchored on the end fittings of a surge arrester. In particular, this document proposes that the reinforcing elements be held firmly by means of a pin or a screw, which extends at right angles to the longitudinal direction of the reinforcing elements and is passed through an unthreaded hole through the rods. The pin and the screw are then held in an appropriate recess or a threaded hole in the end fitting.

Although it is considerably simpler to form a hole in the direction at right angles to the extension direction of the GFC rods which are used as reinforcing elements than to cut a thread in them, this configuration results in the risk of the reinforcing elements being weakened in the area of the hole in such a way that they tear. The cited European patent application furthermore also discloses the option of fixing the reinforcing elements in the end fitting by means of wedges. For this purpose, a wedge which tapers in the direction of the stack centre of the varistor blocks is positioned between each reinforcing element and a correspondingly inclined surface of the end fitting, and the two are held together with radial pressure by an outer part of the end fitting. If a tensile load is applied to the reinforcing elements, static friction results in the wedges being drawn together, thus ensuring that the reinforcing elements are held with a friction lock or force fit between the associated wedge and the end fitting.

In addition, DE 199 40939 discloses the option of holding the reinforcing elements in the end fitting by inserting into a conical hole in the end fitting a sleeve which tapers conically in the direction of the stack centre of the varistor blocks and has moving side walls and which sleeve, as a clamping sleeve, holds the associated reinforcing element firmly under tension by means of a friction-locking connection or force-fitting connection in a similar way to the way already cited European patent application.

Finally, WO 00/55869 proposes that the reinforcing elements be provided with crimp sleeves at their ends, in this way impeding them from sliding through guide grooves into the end fitting.

In the case of all the abovementioned documents, in which the reinforcing elements are held with a friction lock or force fit in the end fitting, it is difficult to apply the necessary tensile strength. Particularly when the surge arrester is subject to a bending load, a very strong tensile force is produced on one side of the surge arrester.

It is difficult to manufacture surge arresters with a crimp sleeve since the crimp sleeve must be applied while the reinforcing element is being held under tension. The crimping process can also result in the rod being damaged without this being evident.

In the case of those surge arresters in which the reinforcing elements are held in the end fitting by means of screws, this necessitates considerable weakening of the reinforcing element in the area of the screw.

SUMMARY OF THE INVENTION

The object of the invention is thus to provide a surge arrester of this generic type with a cage design, which can be manufactured easily and ensures that the reinforcing elements are securely anchored in the end fittings.

This object is achieved by a surge arrester comprising at least one varistor block, at least one end fitting, at least one reinforcing element which holds the varistor block firmly on the end fitting, and at least one anchoring element which holds the reinforcing element firmly on the end fitting, wherein the anchoring element has at least one edge which cuts into the reinforcing element. The dependent claims relate to further advantageous refinements of the invention.

BRIEF DESCRIPTION OF THE DRAWINGS

Various examples of objects, features and attendant advantages of an embodiment of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
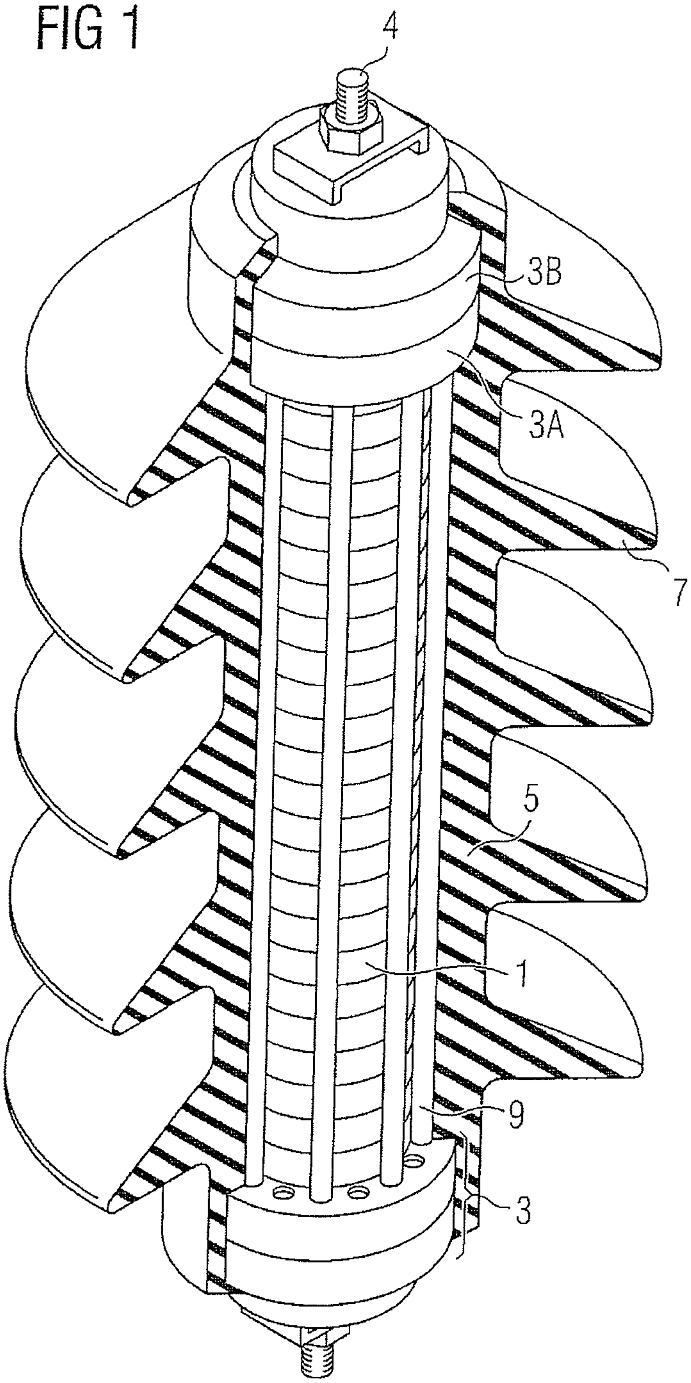
FIG. 1 shows an overall view of a surge arrester of this generic type, with the outer housing partially cut away.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated. It should further be understood that the title of this section of this specification, namely, "Detailed Description of the Invention," relates to a requirement of the United States Patent Office and does not imply, nor should be inferred to limit the subject matter disclosed herein.

In the present disclosure, the words "a" or "an" are to be taken to include both the singular and the plural. Conversely, any reference to plural items, shall, where appropriate, include the singular.

The surge arrester with a cage design as shown in FIG. 1 contains at least one varistor block 1. Known ceramic wafers with a voltage-dependent resistance (variable resistor) may be used as varistor blocks 1. When the voltages are low, they operate as virtually perfect isolators, while they are highly conductive at high voltage. Conventionally available varistor blocks are produced on the basis of zinc oxide (ZnO). However, the invention is not restricted to zinc-oxide surge arresters of this type, and it is also possible to use other metal oxides as well as silicone carbide, for example, for the varistor block. Furthermore, further blocks, for example metal blocks or spark blocks may be included in the stack in addition to varistor blocks 1 in order in this way to match the length of the surge arrester to the requirements of the respective purpose.

Conventional varistor blocks 1 are in the form of circular cylinders with a diameter of, for example, 5 cm and a height of about 4 cm. Aluminium electrodes, which are not shown in detail, are applied to both sides of the varistor blocks 1 in order to ensure better contact. In order to improve the contact further, it is likewise also normal to place thin aluminium discs, which are not shown, between the varistor blocks 1.

A stack, which is formed, by stacking varistor blocks 1 such as these and possibly metal blocks one on top of the other is held between two end fittings 3 in the case of the surge arrester shown in FIG. 1. The end fittings 3 are normally formed from aluminium or stainless steel and are designed such that they can easily be included in existing electrical installations or electrical power supply networks, for example by means of a central screw 4 which projects out of the surge arrester and makes good electrical contact with the varistor blocks 1.

For environmental protection, these surge arresters are surrounded by an external housing 5, often composed of silicone. The housing may be formed by spraying or casting.

In order to increase the current creepage distance, screens 7 are formed on the outside of the housing 5.

As has been described, surge arresters such as these are subject to considerable bending moments when they are used in the open-air environment. It is therefore necessary to ensure that contact is maintained between the varistor blocks 1 and with the end fittings even when relatively large mechanical loads are applied. In order to achieve this, glass-fibre-reinforced plastic rods or cables 9 are normally clamped in as reinforcing elements between the two end fittings 3. These hold the varistor blocks 1 together between the two end fittings 3, with a tensile load. Furthermore, spring elements are also occasionally inserted into the stack of varistor blocks 1 in order in this way to ensure contact even in the event of temperature fluctuations or the like.

In the following text, the anchoring elements are referred to as rods 9, without this being intended to be seen as any restriction to the invention.

Figure 2:
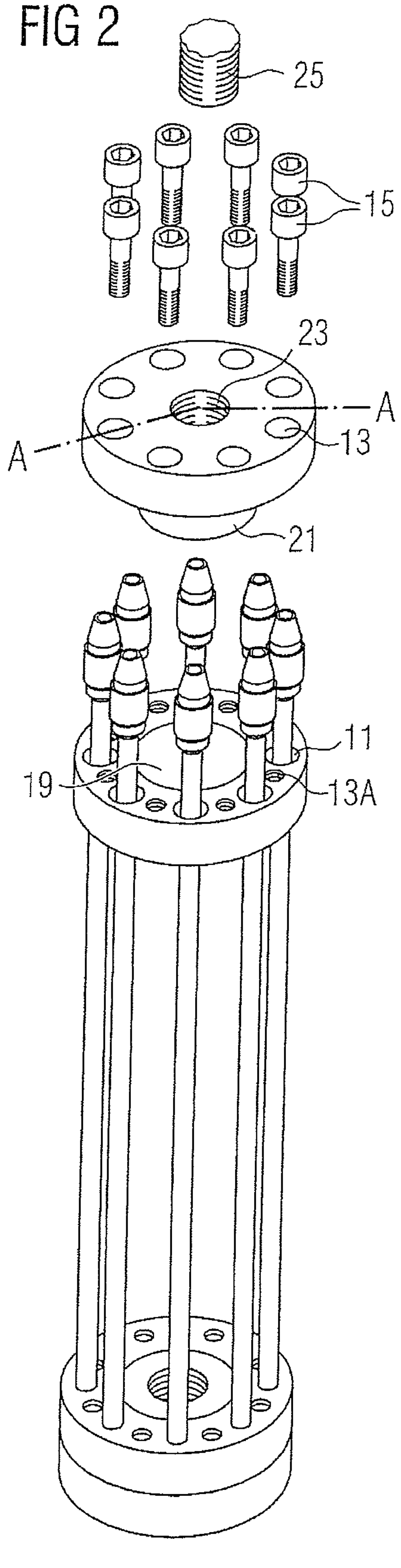
FIG. 2 shows the cage of a surge arrester according to the invention, with an end fitting, in the form of an exploded view.
Figure 3:
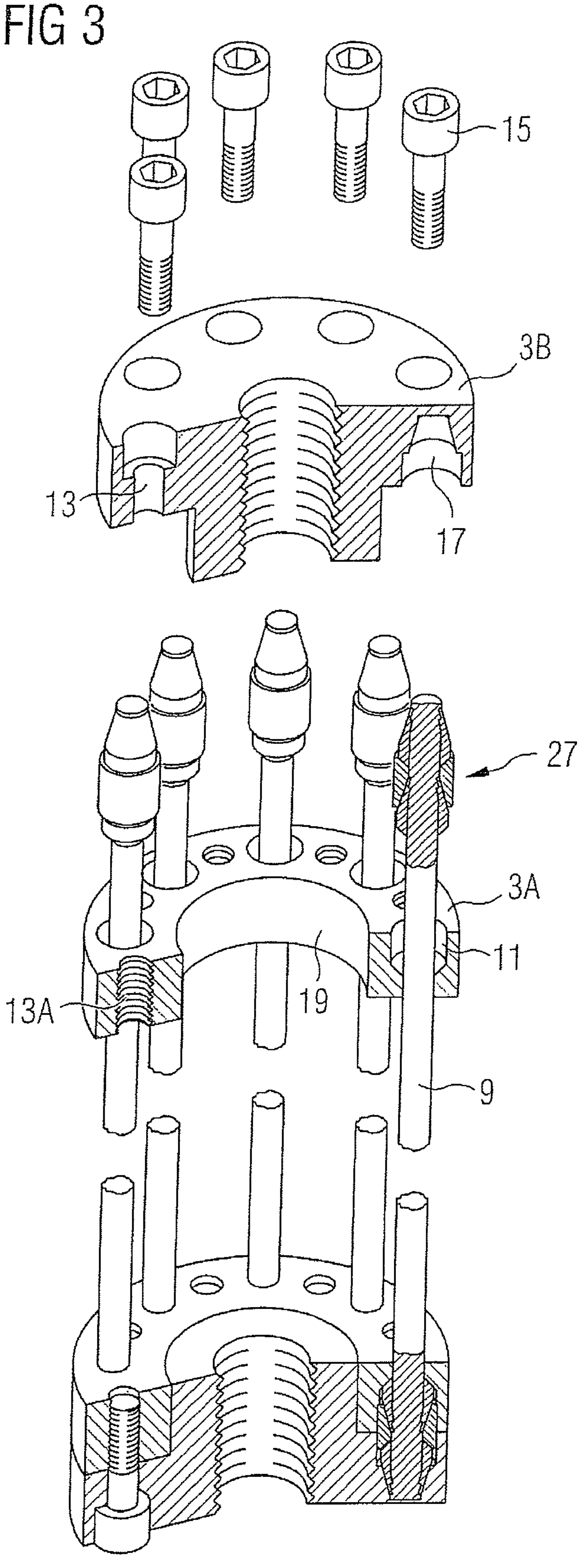
FIG. 3 shows a section view along the line A-A from FIG. 2.

FIG. 2 shows the "cage" of a surge arrester for a first embodiment according to the invention. In order to improve the illustration, the varistor blocks 1 and other components of the stack have been omitted. One of the two end fittings 3 is illustrated in an exploded form, in order to illustrate the embodiment. FIG. 3 shows a section view along the line A-A.

In FIGS. 2 and 3, eight rods 9 are arranged at regular angular intervals along the circumference of the end fittings 3.

The end fitting 3 itself contains a first part 3A and a second part 3B. The first part 3A has eight unthreaded holes 11 for the glass-fibre-reinforced rods 9, and likewise has eight threaded holes 13A for clamping screws 15, with the unthreaded holes 11 and the threaded holes 13A being arranged alternately along the circumference of the first part 3A of the end fitting. The precise number of clamping screw connections and of rods 9 may be chosen by a person skilled in the art, as required. In principle, it is possible to manage with only one clamping screw and/or only one (central) rod, for example when the varistor blocks 1 are in the form of rings. However, arrangements in which three or more rods are distributed along the circumference of the end fitting are preferable, and in which the varistor blocks 1 are in the form of (circular) cylindrical discs.

The second part 3B in the embodiment shown in FIGS. 2 and 3 has eight corresponding through-holes 13 for the clamping screws 15 and eight recesses 17, which are open on only one side, for holding the upper ends of the rods 9.

The first part 3A of the end fitting 3 is in the form of a ring with a central aperture 19. The second part 3B has a guide tube 21 in its centre, which can engage in the ring in the first part 3A. The guide tube 21 is itself provided on its inside with an internal thread 23 into which a further large screw 25 or a bolt can be screwed, which holds the stack of varistor blocks 1 firmly together after assembly, with the rods being subject to a tensile load.

An anchoring element 27 is fitted to each end of each rod 9. This anchoring element 27 is firmly connected to the rod 9, and ensures that the rod 9 remains firmly anchored in the end fitting 3 when tensile loads are applied.

Figure 4:
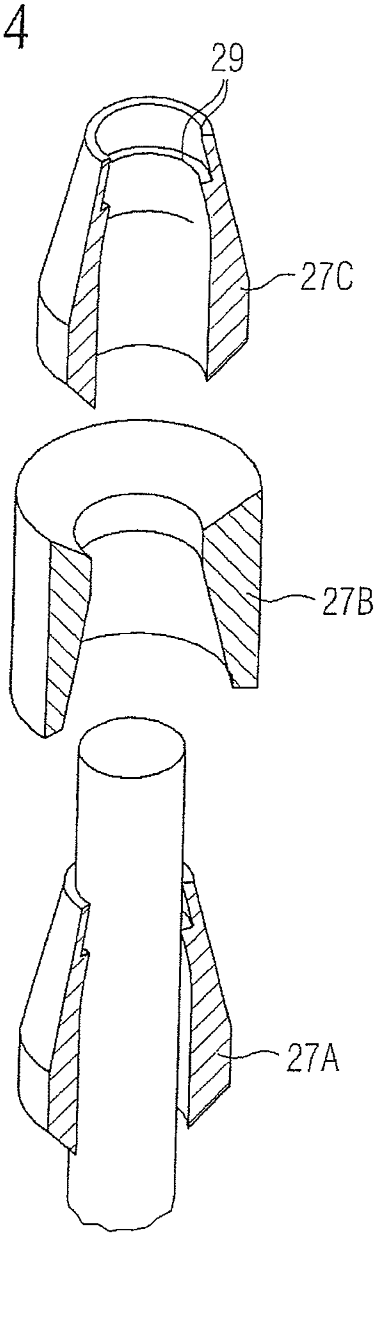
FIG. 4 shows the principle of an anchoring element with a cutting ring, as is used in the surge arrester according to the invention as shown in FIGS. 2 and 3.

One of these anchoring elements 27 is shown in the form of a section in FIGS. 3 and 4. The figures also show how this anchoring element 27 interacts with the second part 3B and the first part 3A of the end fitting in this preferred embodiment.

As can be seen in FIG. 3, the unthreaded hole 13 in the first part 3A of the end fitting has a first narrow section on the side of the varistor blocks 1 and a second wide section on the side of the second parts 3B, which are connected to one another via a conical section. Although FIG. 3 shows a conical section, this is not essential, and a simple shoulder or step can likewise be used. The unthreaded hole 11 should be designed such that it closely surrounds the rod 9 in its narrow section, such that it partially holds the anchoring element 27 in its wide section. The conical section or the shoulder is designed to be complementary to the external contour of the anchoring element 27, in order to allow the anchoring element 27 to rest firmly, securely, and in an interlocking manner in the end fitting 3.

The recess 17 in the second part 3B of the end fitting is likewise equipped with a wide first section on the open side facing the first part 3B, and with a conically tapering section at the closed end. The dimensions of the recess 17 and of the unthreaded hole 11 are of such a magnitude that they can hold the anchoring element 27 in an interlocking manner. This is shown at the bottom in FIG. 3.

By way of example, a commercial available "Ermeto screw fitting" can be used as the anchoring element 27, as has been known since the 1930s.

Ermeto screw fittings such as these are used in engineering for connection of hydraulic pipes and are commercially available inter alia from the company Parker-Ermeto.

The anchoring element 27 in this case has at least one edge 29 which rests on the rod 9 an is inclined in the opposite direction to the tensile load direction.

FIG. 4 shows a detailed view of this embodiment of an anchoring element 27 according to the invention.

The illustrated embodiment of the anchoring element 27 comprises three parts, a first cutting ring element 27A, a clamping sleeve 27B and a second cutting ring element 27C. The two cutting ring elements 27A and 27C are physically identical in the illustrated embodiment and comprise a sleeve whose internal diameter is matched to the external diameter of the rod 9. In the illustrated embodiment, two cutting rings 29 or edges are in each case formed on the inside of the sleeve of the cutting ring elements 27A, 27C and cut into the surface of the rod 9 during use. The edges are preferably inclined in the opposite direction to that of the intended tensile load. The material of the cutting ring elements 27A, 27C has a certain amount of elasticity. The cutting ring may be provided with a slot.

The external contour of the cutting ring elements 27A, 27C is conical in the area of the cutting rings, with the diameter increasing in the direction of the intended tensile load.

The clamping sleeve 27B has a conically tapering internal shape, which is complementary to the external contour of the cutting ring elements 27A, 27C. When the clamping sleeve 27B and a cutting ring element 27A are made to engage and are pushed together in the axial direction of the rod 9, the cutting rings are caused to be driven into the rod 9, cutting into it, by virtue of the complementary inclinations of the external contour of the cutting ring element 27A and the internal shape of the clamping sleeve 27B. The angular position of the cutting ring or rings thus results in an interlocking connection between the rod 9 and the cutting ring which increases to an ever greater extent when a tensile load is applied to the rod, thus holding it more firmly. This well-known cutting ring principle, which has been used for connection of hydraulic pipes since the 1930s, ensures that the anchoring element 27 is held in an excellent manner on the rod 9 when a tensile load is applied.

As mentioned, FIG. 4 shows a second cutting ring element 27C. No specific clamping sleeve is provided for this cutting ring element 27C since this task is carried out by the recess 17 in the second part 3B of the end fitting.

In FIG. 4, each cutting ring element 27A, 27C has two cutting rings 29. Versions with only one cutting ring or with three or more cutting rings are likewise possible.

The cutting ring element 27A, 27C is designed to be smooth on the inside at that end of the cutting ring elements 27A, 27C which faces the direction of the intended tensile load, and is closed in the external contour by a second, relatively steep cone, with the diameter decreasing in the direction of the intended tensile load.

This second cone is associated with a corresponding section of the clamping sleeve 27B or of the unthreaded hole 11 in the first part 3A of the end fitting 3.

Axial clamping of the cutting ring element 27C and of the clamping sleeve 27B and/or of the cutting ring element 27A and of the first part 3A of the end fitting 3 result/results by virtue of this shape in deformation of the cutting ring element 27A, 27C, and this leads to a force-fitting connection between the cutting ring element 27A, 27B and the rod 9. In the technology of cutting rings for pipe connections, these cutting rings are used for additional sealing for a hydraulic fluid.

Although this force-fitting connection also contributes to the rod 9 being held in the anchoring element 27, this is of secondary importance for the invention and may also be entirely absent. By way of example, there is no need for the second cone on the cutting ring element 27A, 27C. The clamping sleeve 27B on the unthreaded hole 11 can then also be designed without the complementary second cone, for example with a simple shoulder or step.

This cutting ring connection makes it possible to avoid serious damage leading to weakening of the rod 9, since the cutting rings 29 do not cut very deeply into the rod 9. Furthermore, as is shown in FIG. 4, a plurality of cutting rings 29 can be arranged one behind the other.

For assembly of the surge arrester according to the invention, as it is shown in FIGS. 1 to 4, a stack of varistor blocks 1 and, optionally, metal blocks, are arranged between the first annular parts 3A of two end fittings 3. The rods 9 are then passed through the unthreaded holes 11, which are provided for this purpose in the first parts 3A of the end fittings 3.

On one side of the stack, the rods 9 are positioned to have a standard length, and the anchoring elements 27 are pushed on. The second part 3B of the end fitting is then applied on this side. The first and second parts 3A, 3B of the end fitting are firmly clamped to one another by means of the first clamping screws 15, which extend through the unthreaded holes 13 in the second part 3B of the end fitting and engage in the threaded holes 13A in the first part 3A of the end fitting. As is shown in FIG. 2, the two parts of the end fitting are designed such that they hold the anchoring elements 27 completely in the corresponding recesses, and surround them.

The clamping screw 25 is then screwed through the central opening in the end fitting and rests on the varistor blocks 1, or on a cam disc, which is composed of aluminium or stainless steel and is located between the uppermost varistor block 1 and the end fitting 3.

The rods 9 are then provided with the anchoring elements 27 on the opposite side of the varistor stack.

In this case as well, the second part 3B of the end fitting 3 is fitted and is clamped against the first part 3A by the first clamping screws 11, as already discussed.

A second large clamping screw 25 is driven through the central thread of the end fitting 3, so that it rests on a corresponding disc cam or on the uppermost varistor block. The lower and upper central large clamping screws 25 are tightened using a torque wrench, so that the stack of varistor blocks is held together with a defined pressure.

The cage that is formed in this way is then provided with an external housing. This is advantageously done by extrusion coating or encapsulation of the stack of varistor blocks, of the rods 9 and of the end fittings 3. A low-viscosity silicone has been found to be suitable as a material for the plastic external housing. Low-viscosity silicones such as these are commercially available and have also already been used in the prior art for housings.

The screens 7 can be cast on at the same time as the formation of the housing 5. As an alternative to this, it is possible to first of all design the housing to be cylindrical, and to then produce the screens 7 separately. The screens 7 can then be fitted to the housing 5 by mechanical strain relief and/or by adhesive bonding. The separate fitting of the screens 7 admittedly represents an additional process, which increases the costs of the surge arrester, but this makes it possible to avoid longitudinal seams along the surge arrester, on which creepage currents can develop owing to dirt.

Figure 5:
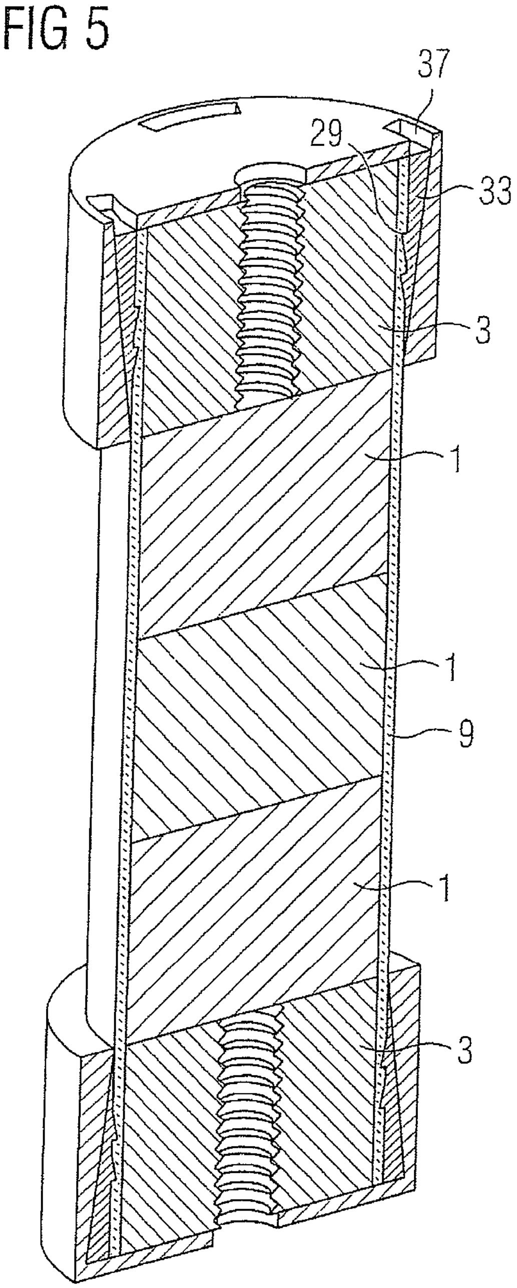
FIG. 5 shows an alternative refinement of the surge arrester according to the invention.

FIG. 5 shows an alternative embodiment of the surge arrester according to the invention.

In contrast to the embodiment shown in FIGS. 2 to 4, the rods 9 do not have a circular cross section. The shape of the rods 9 shown in FIG. 5 is matched to the external contour of the stack of varistor blocks 1. The external housing 5 of the surge arrester can thus be designed to be thinner overall, since the rods 9 are less thick for the same tensile strength. This is advantageous because low-viscosity silicone is expensive.

When using glass-fibre-reinforced rods 9 such as these, for example in the form of circular segments, the principle of the cutting ring connection must, however, be modified in such a way that one or more cutting blades 31, whose contours are matched to the rod 9, are provided instead of one continuous cutting ring surrounding the rod. This is shown in the form of a section in FIG. 5.

Figure 6:
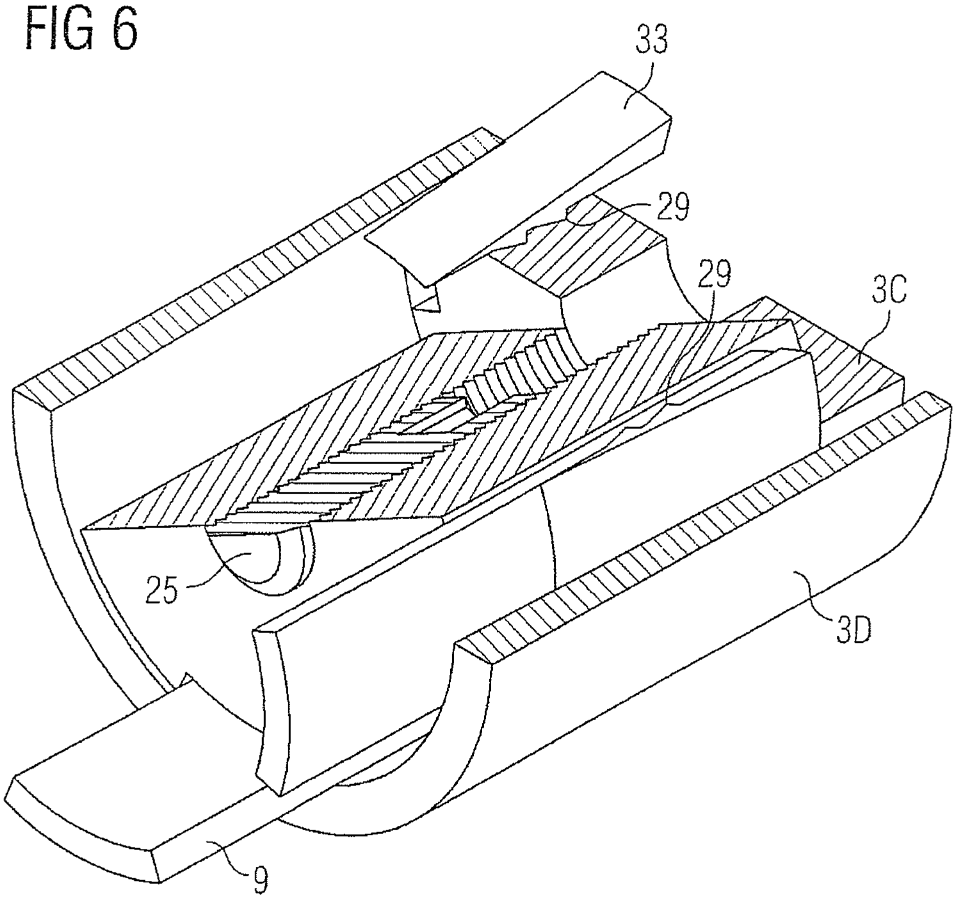
FIG. 6 shows a detailed view of the rod with a cutting element as shown in FIG. 5.

FIG. 6 shows, in detail, further particulars of the end fitting 3 and of the anchoring element 27 in this embodiment.

In the embodiment shown in FIGS. 5 and 6, the end fitting 3 is once again formed from two parts. An inner part 3C is designed to be annular or in the form of a hollow cylinder, and has an internal thread 31 through which the clamping screw 25 can extend. Guide grooves are preferably formed along this inner part, and their contours correspond to those of the rods 9, as can be seen in FIG. 6. The inner part 3C of the end fitting is surrounded by an outer part 3D of the end fitting in the form of a cup, with the internal diameter of the cup being matched to the external diameter of the inner part in the region outside the grooves. The outer part 3D, which is in the form of a cup, is designed to be slightly conical, tapering in the direction of the intended tensile load, that is to say towards the centre of the stack of varistor blocks 1. Wedges 33 are fitted between the rods 9 and the outer part 3D of the end fitting, and likewise taper towards the centre of the stack of varistor blocks 1.

One or more cutting blades 29 is or are formed transversely with respect to the longitudinal direction of the rod 9 on the side of the wedge 33 facing the rod 9, and these cutting blades 29 are angled at an acute angle in the opposite direction to that of the intended tensile load, towards the centre of the stack of varistor blocks. A complementary cutting blade 29A, which is likewise matched to the shape of the glass fibre-reinforced rod 9, may be formed in the guide groove in the inner part 3C of the end fitting, although this is not illustrated in the figures.

A plurality of cutting blades 29 are preferably formed both on the wedge 33 and on the inner part of the end fitting 3.

When a tensile load is applied, the rod 9 is on the one hand held with a force fit between the inner part 3C and the outer part 3D of the end fitting by means of the wedge 33. On the other hand, the rod 9 is furthermore held by the cutting blades 29 between the wedge 33 and the rod 9 on the one hand and between the inner part 3C of the end fitting and the rod 9 on the other hand, in an interlocking manner.

The advantage of this embodiment over the embodiments shown in FIGS. 2 to 4 is that the assembly process is simplified. The wedges 33 can be driven through suitable openings 37 on the bottom face of the outer part 3D of the end fitting, which is in the form of a cup, once the two end fittings 3 have been provided with the rods 9 and have been arranged around the stack of varistor blocks. Once the wedges 33 have been driven in, the entire structure may have the required pressure applied to it by means of the clamping screws 25 through the centre of the inner part 3C of the end fitting.

The external plastic housing 5 is then fitted, as in the embodiment shown in FIGS. 2 to 4.

Although the embodiment shown in FIGS. 5 and 6 shows the inner part 3C of the end fitting being formed with guide grooves 35, this is not essential. Instead of or in addition to this, the outer part 3D of the end fitting can also be equipped with guide grooves, or the guide grooves 35 may be completely omitted. In this case, however, a gap remains between the inner and the outer part of the end fitting, which must then be filled with the silicone elastomer during the formation of the housing 5.

In accordance with a further advantageous refinement, it is possible to additionally use an adhesive for further security of the rods 9 in the end fittings. For example, in the case of the most recently discussed embodiment, the gap between the outer and the inner part of the end fitting can be filled with adhesive until this gap is completely filled with adhesive.

Although the preferred embodiments of the invention have been described above, the invention is not restricted to these embodiments. In particular, the number of cutting blades or cutting rings may be selected freely as required. In addition to or instead of the interlocking connection of the cutting ring by cutting into the outer layer of the rods, use of flexible cutting rings also allows a force-fitting connection to be achieved by clamping without any damage to the surface of the rods, when no excessive tensile loads are expected. By way of example, this is the situation when the surge arrester is not provided with the directly fitted housing 5 but is inserted into a tube composed of glass-fibre-reinforced plastic, or into a ceramic housing, as a so-called surge arrester with a tubular design. In this case, a considerable proportion of the mechanical forces are absorbed by the tube itself, and the rods are used only as an additional stabilization element, so that the expected tensile loads are reduced.

Although the anchoring of the rods to the end fittings was implemented in the same way in each case on both sides of the stack of varistor blocks in the illustrated embodiments, this is not essential. By way of example, cables can also be used instead of glass-fibre-reinforced rods, which are then passed over a shoulder for anchoring purposes for one of the end fittings, and are secured by anchoring elements according to the invention only for the opposite end fitting.

Here, the embodiments explained above are given in order to facilitate an understanding of the technical idea of the present invention. They do not restrict the present invention in any way. Therefore, the respective elements disclosed in the aforementioned embodiments are intended to include all design modifications and their equivalents that belong to the technical scope of the present invention.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed:

1. A surge arrester, comprising:

at least one varistor block;

at least one end fitting;

a plurality of unthreaded reinforcing elements which hold the varistor block firmly on the end fitting, with each of the plurality of unthreaded reinforcing elements being a glass-fiber-reinforced plastic rod or a cable which holds the end fitting and the varistor block together when subjected to a tensile load; and a plurality of anchoring elements each of which holds an associated one of the plurality of unthreaded reinforcing elements firmly on the end fitting;

wherein each anchoring element has at least one edge defined by two surfaces that are inclined at angles relative to the end fitting and which cuts into the associated unthreaded reinforcing element, and wherein the edge of each anchoring element forms a cutting ring, which surrounds the glass-fiber-reinforced plastic rod or the cable and cuts into its surface.

2. A surge arrester according to claim 1, wherein the varistor block is formed from a metal oxide including ZnO.

3. A surge arrester according to claim 1, wherein the end fitting is formed from a metal.

4. A surge arrester according to claim 3, wherein the end fitting is formed from aluminum.

5. A surge arrester according to claim 1, wherein the surge arrester has a housing with at least one screen.

6. A surge arrester according to claim 1, wherein each anchoring element is a wedge which interacts with a corresponding inclined surface on the end fitting, with the edge being in the form of a cutting blade on that side of the wedge which faces the associated unthreaded reinforcing element, and cuts into the associated unthreaded reinforcing element when subjected to a tensile load by the wedge and the inclined surface.

7. A surge arrester according to claim 1, wherein a plurality of edges are formed on each of the plurality of anchoring elements and interact with the plurality of unthreaded reinforcing elements.

8. A surge arrester according to claim 1, wherein the plurality of anchoring elements are connected in an interlocking manner to the plurality of unthreaded reinforcing elements and to the end fitting.

9. A surge arrester according to claim 1, wherein the edge cuts into the associated unthreaded reinforcing element in a direction opposite to the direction of the tensile load.

10. A surge arrester, comprising:

at least one varistor block;

at least one end fitting;

a plurality of unthreaded reinforcing elements which hold the varistor block firmly to the end fitting, each of the plurality of unthreaded reinforcing elements being a glass-fiber-reinforced plastic rod or a cable; and a plurality of anchoring elements each of which holds associated one of the plurality of unthreaded reinforcing elements firmly on the end fitting;

wherein each of the plurality of anchoring elements has at least one edge defined by two surfaces that are inclined at angles relative to the end fitting and which cuts into the associated unthreaded reinforcing element, and wherein each of the plurality of anchoring elements is a wedge which interacts with a corresponding inclined run-on surface on the end fitting, with the edge being in the form of a cutting blade on that side of the wedge which faces the associated unthreaded reinforcing element, and cuts into the associated unthreaded reinforcing element when subjected to a tensile load by the wedge and the run-on surface.

11. A surge arrester according to claim 1, wherein the cutting of the edge of each anchoring element into the associated unthreaded reinforcing element prevents relative movement between the anchoring element and the associated unthreaded reinforcing element when the surge arrester is used.

12. A surge arrester according to claim 1, wherein each anchoring element has only one edge.

13. A surge arrester according to claim 10, wherein each of the plurality of unthreaded reinforcing elements comprises tubular segment composed of a glass-fiber-reinforced plastic material.

14. The surge arrester of claim 10, wherein each of the plurality of anchoring elements completely surrounds the associated unthreaded reinforcing element.

15. The surge arrester of claim 10, wherein each of the plurality of anchoring elements comprises a second cutting edge that cuts into the associated unthreaded reinforcing element and is spaced axially from the first recited cutting edge.

16. A surge arrester according to claim 10, wherein the varistor block is formed from a metal oxide including ZnO.

17. A surge arrester according to claim 10, wherein the end fitting is formed from a metal including aluminum.

18. A surge arrester according to claim 10, wherein the surge arrester has a housing with at least one screen.

19. A surge arrester according to claim 10, wherein the edge cuts into the associated unthreaded reinforcing element in a direction opposite to the direction of the tensile load.

20. A surge arrester according to claim 1, wherein the plurality of anchoring elements are connected in an interlocking manner to the plurality of unthreaded reinforcing elements and to the end fitting.

* * * * *